(12) United States Patent
Dostal et al.

(10) Patent No.: US 8,855,697 B2
(45) Date of Patent: Oct. 7, 2014

(54) METHOD FOR ESTABLISHING A PUSH-TO-TALK COMMUNICATION LINK

(75) Inventors: Pavel Dostal, Morice (CZ); Ivo Sedlacek, Kurim (CZ)

(73) Assignee: Nokia Siemens Networks GmbH & Co., KG, Munich (DE)

( * ) Notice: Subject to any disclaimer, the term of this patent is extended or adjusted under 35 U.S.C. 154(b) by 1319 days.

(21) Appl. No.: 12/300,003

(22) PCT Filed: May 7, 2007

(86) PCT No.: PCT/EP2007/054409
§ 371 (c)(1),
(2), (4) Date: Feb. 19, 2009

(87) PCT Pub. No.: WO2007/128809
PCT Pub. Date: Nov. 15, 2007

(65) Prior Publication Data
US 2009/0280851 A1    Nov. 12, 2009

(30) Foreign Application Priority Data

May 8, 2006 (DE) .......................... 10 2006 021 375

(51) Int. Cl.
*H04B 7/00* (2006.01)
*H04L 29/06* (2006.01)

(52) U.S. Cl.
CPC ......... *H04L 65/1069* (2013.01); *H04L 65/1016* (2013.01); *H04L 69/24* (2013.01); *H04L 65/1006* (2013.01); *H04L 64/14* (2013.01); *H04L 65/4061* (2013.01); *H04L 65/80* (2013.01)
USPC ....................................................... 455/518

(58) Field of Classification Search
CPC ....... H04W 4/10; H04W 76/064; H04W 4/08; H04W 1/3877
USPC ....................................................... 455/518
See application file for complete search history.

(56) References Cited

U.S. PATENT DOCUMENTS

2004/0057405 A1*   3/2004   Black ............................ 370/335
2005/0124365 A1*   6/2005   Balasuriya et al. ........... 455/518
2006/0034195 A1    2/2006   Blaiotta et al.

FOREIGN PATENT DOCUMENTS

EP        1619854 A1    1/2006
WO     2005018200 A1    2/2005

OTHER PUBLICATIONS

Anonymous, "OMA PoC System Description. Draft Version 2.0" Open Mobile Alliance (OMA) Specifications, [Online] Apr. 25, 2006, pp. 1-232, XP002411348.

(Continued)

*Primary Examiner* — Ankur Jain
(74) *Attorney, Agent, or Firm* — Laurence A. Greenberg; Werner H. Greenberg; Ralph E. Locher (57) ABSTRACT

The invention relates to a method for establishing a push-to-talk-(Ptt) communication link between two Ptt devices (1,2), in which the data of different types, such as voice data (Sp), audio data (A), video data (V) etc., is transmitted between the Ptt devices (1,2). The first Ptt device (1) transmits a Ptt link request, and subsequently a communication link is established for at least one selection of said different types of data via a communication channel (F1, NF) according to a communication protocol. According to the invention, the Ptt link request contains priority information which enables the data types to be allocated a transmission priority, and the communication protocol only authorizes the communication channel (F1, NF) to be established if the second Ptt-device (2) is available for the data type or for the data types having the highest transmission priority. The transmission of one data type, which has a lower transmission priority, by means of said communication channel (F1, NF) is only authorized if the second Ptt-device (2) is available for said data type, and the second Ptt-device (2) is also available for all data types with a higher transmission priority.

10 Claims, 4 Drawing Sheets

(56) References Cited

OTHER PUBLICATIONS

Rosenberg et al., "Guidelines for Usage of the Session Initiation Protocol (SIP) Caller Preferences Extension" IEFT Standard-Working-Draft, Intenet Engineering Task Force, IETF, CH, Bd. sipping, Nr. 5, Oct. 5, 2005, pp. 1-40, XP015040705.

Ivo Sedlacek, "Common Media in Multimedia PoC Session" Open Mobile Alliance (OMA) POC V2 Documents, [online] May 8, 2006, pp. 1-9, XP002411302.

Blum et al, "PTT + IMS = ptm—towards community/presence-based IMS multimedia services" Seventh IEEE International Symposium on Multimedia, Dec. 12-14, 2005, Irvine, CA, USA, Dec. 12, 2005 pp. 337-344, XP010870552.

Ivo Sedlacek, "SDP Media types" Open Mobile Alliance (OMA) POC V2 Documents, Apr. 30 2006, pp. 1-12, XP002411349.

Jihye Lee et al, "Multimedia Session Establishment Scenarios" Open Mobile Alliance (OMA) POC V2 Documents, [online] Feb. 27, 2006, pp. 1-10, XP002411350.

International Search Report dated Aug. 14, 2007.

\* cited by examiner

METHOD FOR ESTABLISHING A PUSH-TO-TALK COMMUNICATION LINK

CLAIM FOR PRIORITY

This application is a national stage application of PCT/EP2007/054409, filed May 7, 2007, which claims the benefit of priority to German Application No. 10 2006 021 375.0, filed May 8, 2006, the contents of which hereby incorporated by reference.

TECHNICAL FIELD OF THE INVENTION

The invention relates to a system and method for establishing a push-to-talk (Ptt) communication link between a first Ptt device and a second Ptt device.

BACKGROUND OF THE INVENTION

Push-to-talk (Ptt) communication links are used, in particular, in connection with mobile radio technology, in which case they are also referred to as push-to-talk-over-cellular (PoC) links since the corresponding Ptt devices are mobile radios. In this case, it is possible for a mobile radio subscriber to use its Ptt device to transmit a voice message to one or more recipients at the same time via a mobile radio interface, usually by operating a button. In this case, the voice data are usually distributed over the mobile radio communication network even while the sender is talking and are transmitted to the desired recipient(s). A PoC communication link is therefore similar to the known CB radio but has the big difference that the subscribers of a PoC link can be reached worldwide since the data are transmitted via a mobile radio network. The text below refers primarily to PoC links but the invention is not, in principle, restricted to use in the mobile radio sector.

PoC communication technically functions in a similar manner to Internet telephony ("Voice over IP", VoIP). The subscribers first receive signaling by means of the SIP protocol (Session Initiation Protocol) and the voice data ("Talk Bursts") are then transmitted using the RTP protocol (Real-Time Transport Protocol). In this case, an attempt is made to achieve the greatest possible standardization in order to ensure that the participating PoC devices are compatible. The "PoC Version 1.0" standard and a version 2.0, which are intended to define the fundamental properties of the communication protocols for establishing and operating the PoC communication link, currently exist, for instance.

According to currently customary industrial specifications, two different variants for establishing a PoC communication link (that is to say a PoC session) are described, said variants differing in the time at which a first PoC user can begin to talk after the PoC session has been established with a PoC server unit and the voice data are transmitted to the further PoC subscribers.

According to the so-called "late media mode", the first PoC user, that is to say a first PoC client unit, is enabled to transmit data, for instance voice data, only when a PoC communication link has actually been established to a selected PoC user, which is also a PoC client unit, and this PoC user has also accepted the Ptt link request.

According to the second variant, which is also referred to as the "early media mode", the PoC server unit has already enabled the first PoC user to transmit data even though there is not yet a communication link between the PoC server unit and the selected PoC subscriber. The first PoC subscriber therefore cannot be certain whether its data have been already received by the second PoC subscriber.

Additional difficulties arise when establishing a PoC session if data of different types are intended to be transmitted, that is to say not only voice data but also audio data (for example music files), video data, images, text messages or other textual data, as is also provided for in the PoC Version 2.0 standard. Difficulties may arise in this case, for instance, if not every one of the PoC clients can technically use each type of data or if a particular PoC client would not like to receive a particular type of data (for instance voice or audio data if the subscriber would like to operate its PoC device in the silent mode in particular situations). In these cases, only subgroups of types of data from a group of different types of data contained in the link request from a PoC client (the so-called "PoC initiator") can be accepted by the other PoC clients. According to the prior art, the PoC initiator therefore does not have any opportunity whatsoever to determine whether the other PoC clients are ready to receive and what types of data they are ready to receive. It goes without saying that it would be possible, during a PoC session, to detect whether another subscriber can receive a particular type of data but the PoC session has already been created at this time and has already given rise to costs. It would be advantageous instead to be able to decide, even before a PoC session is established, whether a link to a subscriber is intended to be established.

This difficulty is mentioned in the PoC Version 2.0 standard without proposing a solution to it. Such a solution should be as simple as possible and should ensure that a PoC client is admitted to a PoC session only when it is ready to receive at least one type of data in common with all other PoC clients participating in the PoC session.

SUMMARY OF THE INVENTION

One embodiment of the invention relates to a method for establishing a push-to-talk (Ptt) communication link between a first Ptt device and a second Ptt device, in which data of different types, for instance voice data, image data or text data, are transmitted between the first Ptt device and the second Ptt device, the first Ptt device transmitting a Ptt link request for the mutual transmission of different types of data to the second Ptt device, and a communication link subsequently being established for at least a selection of these different types of data via a communication channel according to a communication protocol.

The invention, in another embodiment, also relates to a push-to-talk (Ptt) device for establishing a push-to-talk (Ptt) communication link to a further Ptt device, in which data of different types, for instance voice data, image data or text data, are transmitted between the first Ptt device and the second Ptt device via a communication channel according to a communication protocol.

In still another embodiment, the invention also relates to a communication arrangement for establishing a push-to-talk (Ptt) communication link, having a first Ptt device and a second Ptt device, between which data of different types, for instance voice data, image data or text data, are transmitted via a communication channel according to a communication protocol, and a Ptt server.

More specifically, one embodiment of the invention relates to a method for establishing a push-to-talk (Ptt) communication link between a first Ptt device and a second Ptt device, in which data of different types, for instance voice data, audio data, video data, image data, text data or other, textual data, are transmitted between the first Ptt device and the second Ptt device, the first Ptt device transmitting a Ptt link request for the mutual transmission of different types of data to the second Ptt device, and a communication link subsequently being established for at least a selection of these different types of data via a communication channel according to a communication protocol. The invention provides for the Ptt link request to contain an item of priority information which is used to allocate a transmission priority to the different types of data to be transmitted via the communication channel, and for the communication protocol to allow a communication channel to be established with the second Ptt device only when the second Ptt device is available for the type or types of data having the highest transmission priority and to allow a type of data having a lower transmission priority to be transmitted via this communication channel only when the second Ptt device is available for this type of data and the second Ptt device is also available for all types of data having a higher transmission priority.

A "ranking" of the different types of data is thus created, which ranking is either the same for every PoC session or can be determined by the PoC initiator before the PoC session is established. A PoC client which is invited to a PoC session can participate according to the invention only when it supports the type of data having the highest transmission priority. For a type of data having a lower priority, the invited PoC client may again participate only when it supports all types of data having a higher transmission priority. This communication protocol therefore allows the PoC initiator to determine, before the PoC session, that each participating PoC client supports at least one type of data, to be precise that type which has been given the highest priority by the PoC initiator.

In this case, the types of data are transmitted via communication channels which are understood as meaning organizational transmission paths in which a communication protocol is implemented for the transmission of a group of types of data which are subject to this communication protocol. Such communication channels are also referred to as "Media Floor Control Entities", in which case the "media" are the present types of data and "media floor control" is a communication protocol. In this case, it is customary for continuous (real-time) types of data, for instance voice, audio or video data, to be transmitted via a communication channel, but it is not customary to select a separate communication channel in the case of discrete (non-real-time) types of data, for instance text messages or textual files.

However, as will be explained in even more detail, it is advantageous within the scope of the invention to also define a communication channel for discrete types of data. Therefore, the invention provides for a first communication channel to be used for a first subgroup of the different types of data to be transmitted, and for a second communication channel to be used for a second subgroup of the different types of data to be transmitted.

This measure makes it possible, in particular, to implement the invention, according to which the Ptt link request includes an item of priority information which is used to allocate a transmission priority to the communication channels, and the communication protocol allows the communication channel having the lower transmission priority to be established only when the communication channel having the higher transmission priority has been established.

In one aspect of the invention, the Ptt communication link is a mobile radio communication link, for instance for establishing a PoC session. In another aspect, the Ptt link request is made using an SIP INVITE message. According to claim 6, the transmission priority can be allocated, for instance, in the Session Description Protocol.

Yet another embodiment of the invention relates to a push-to-talk (Ptt) device for establishing a push-to-talk (Ptt) communication link to a further Ptt device, in which data of different types, for instance voice data, audio data, video data, image data, text data or other, textual data, are transmitted between the first Ptt device and the second Ptt device via a communication channel according to a communication protocol. The invention provides such a device with a unit for creating a Ptt link request containing an item of priority information which is used to allocate a transmission priority to the different types of data to be transmitted via the communication channel, and with a transmitting unit for transmitting the Ptt link request to a further Ptt device.

Finally, still another embodiment of the invention relates to a communication arrangement for establishing a push-to-talk (Ptt) communication link, having a first Ptt device and a second Ptt device, between which data of different types, for instance voice data, audio data, video data, image data, text data or other, textual data, are transmitted via a communication channel according to a communication protocol, and a Ptt server. In this case, the invention proposes that the Ptt devices each comprise a unit for creating a Ptt link request and a transmitting unit for transmitting the Ptt link request to a further Ptt device, the Ptt link request from the first Ptt device containing an item of priority information which is used to allocate a transmission priority to the different types of data to be transmitted via the communication channel, and the Ptt server being provided with a communication protocol which allows a communication channel to be established between the first Ptt device and the second Ptt device only when the second Ptt device is available for the type or types of data having the highest transmission priority and allows a type of data having a lower transmission priority to be transmitted via this communication channel only when the second Ptt device is available for this type of data and the second Ptt device is also available for all types of data having a higher transmission priority.

BRIEF DESCRIPTION OF THE DRAWINGS

The invention is explained in more detail below using the accompanying figures, in which.

DETAILED DESCRIPTION OF THE INVENTION

Figure 1:
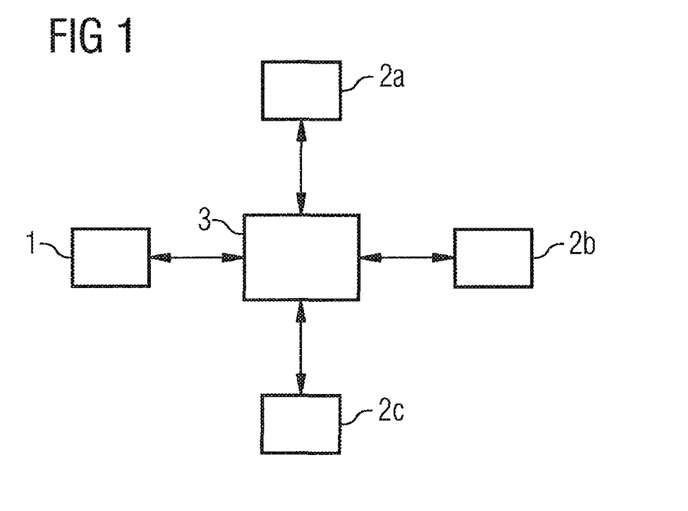
FIG. 1 shows a diagrammatic illustration of a communication arrangement having a PoC initiator, a PoC server unit and three further PoC subscribers which are contacted by the PoC initiator.

The invention generally relates to push-to-talk (Ptt) communication arrangements having Ptt clients or Ptt devices 1, 2 and at least one Ptt server unit 3. The invention shall be explained below with reference to a special arrangement of this type, namely a push-to-talk-over-cellular (PoC) communication arrangement having a PoC initiator 1, a PoC server unit 3 and three further PoC clients 2a, 2b, 2c which are contacted by the PoC initiator 1. The PoC clients 1, 2a, 2b, 2c are each set up to communicate according to the UMTS standard, the GSM standard, the GPRS standard or another mobile radio communication standard.

Within the scope of the invention, PoC communication is generally understood as meaning communication between the PoC clients 1, 2a, 2b, 2c via a mobile radio interface, in which the sender can transmit voice data to at least one recipient, preferably to a plurality of recipients at the same time, according to the duplex method, preferably according to the half-duplex method, for example by selecting a special button on the PoC device. This presupposes that a PoC session has already been established, the sender and the recipient being able to be one of any of the PoC clients 1, 2a, 2b, 2c. According to the half-duplex method, only the person using the transmitting unit can speak; the people using the receiver units can only listen to the person using the transmitting unit and cannot interrupt.

According to the PoC technology, the spoken voice data are usually distributed to the other PoC clients 1, 2a, 2b, 2c via the IMS (IP Multimedia Subsystem) core communication network even while the voice data are being spoken by a PoC client 1, 2a, 2b, 2c. This technology is also referred to as "streaming". A PoC communication link can therefore be compared with the known CB radio but with the big difference that the subscribers of a PoC link can be reached worldwide since the data are transmitted via a mobile radio network.

In the event of the sender wishing to address the same recipients again and again, the PoC service for each PoC client 1, 2a, 2b, 2c provides for defining its personal, permanently predefined groups of PoC clients 1, 2a, 2b, 2c. For example, a group of PoC clients 2a, 2b, 2c and their respective addresses may thus be defined. The addresses may be stated, for example, in the form of a telephone number as a Session Initiation Protocol Unique Resource Locator (SIP-URL) or in the form of a Session Initiation Protocol address (SIP address as an SIP-URL). In this case, the user-defined group of PoC clients 2a, 2b, 2c usually receives its own group address, for example likewise in the form of an SIP-URL, with the result that the PoC initiator 1 can address all members of the group using the PoC server unit 3 when establishing a PoC session and can invite them to the PoC session. In this case, the PoC link request is transmitted to all PoC clients 2a, 2b, 2c in the respective group.

The PoC clients 1, 2a, 2b, 2c and the PoC server unit 3 are generally set up to communicate according to the Session Initiation Protocol (SIP) and, in the lower communication layers, that is to say in the transport layer, to communicate according to the Transport Control Protocol (TCP) and/or User Datagram Protocol (UDP) and, in the network layer, to communicate according to the Internet Protocol (IP). The PoC communication arrangement according to FIG. 1 is therefore set up to communicate on the basis of the IP Multimedia Subsystem (IMS).

After a PoC session has been established, useful data, in particular voice data but also audio, video or text data, are transmitted according to the half-duplex method from the first PoC client 1 to the PoC clients 2a, 2b, 2c specified in the respectively selected group via the IP-based communication network and the PoC server unit 3.

As illustrated in FIG. 1, the PoC clients 1, 2a, 2b, 2c are connected to the PoC server unit 3 by means of a respective mobile radio interface, the mobile radio interfaces being able to be constructed using the Radio Access Network (RAN), the Core Network (CN) and the IP Multimedia Subsystem in those cases in which the communication arrangement is based on the UMTS standard.

Figure 2:
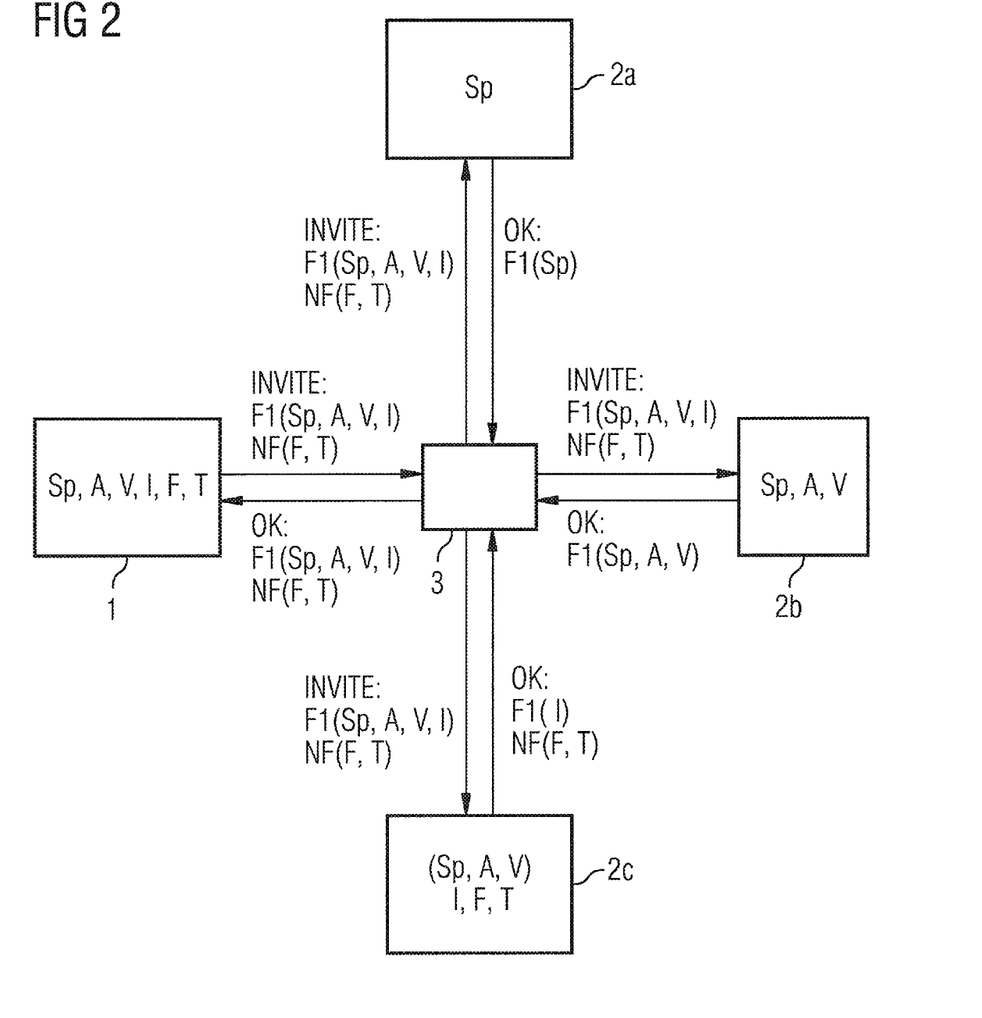
FIG. 2 shows a diagrammatic illustration of the conventional establishment of a PoC session in a communication arrangement according to FIG. 1.

As illustrated in a first message flowchart in FIG. 2, the PoC initiator 1 first of all transmits an SIP INVITE message to the PoC server unit 3 using the UMTS core network. The types of data to be transmitted may be, for instance, voice data Sp, audio data A, video data V, image data I, text data T or other, textual data F (for example files). As illustrated in FIG. 2, the PoC initiator 1, for example, can transmit and receive all of these types of data and therefore invites all other PoC clients 2a, 2b, 2c in its PoC link request to a PoC session in which all of these types of data are intended to be interchanged. In this case, a communication channel F1 is defined for the voice data Sp, audio data A, video data V and image data I. A second communication channel NF is defined for the discrete types of data, for instance the text data T and the other data F.

The PoC link request shown in FIG. 2 is first of all sent in the form of an SIP INVITE message to the PoC server unit 3 which forwards it to the selected PoC clients 2a, 2b, 2c. In this case, the PoC client 2a supports only voice data Sp, for example, and is also available for a PoC session. The PoC client 2a therefore accepts the establishment of a communication channel F1 for voice data Sp.

In this example, the PoC client 2b supports voice data Sp, audio data A and video data V and is likewise available for a PoC session. The PoC client 2b therefore accepts the establishment of a communication channel F1 for voice data Sp, audio data A and video data V.

In this example, although the PoC client 2c supports all types of data, it is available for a PoC session only for image data I, other data F and text data T. It could be the case, for instance, that the PoC client 2c is in a meeting and would like to operate its PoC device in the silent mode. The PoC client 2c therefore accepts the establishment of a communication channel F1 for image data I and the establishment of a communication channel NF for other data F and text data T.

The PoC server unit 3 thus transmits the response to the PoC initiator 1 that there is a need for the establishment of communication channels F1 and NF for all types of data. The PoC session is subsequently established in a known manner, but the PoC client 2c cannot communicate with the PoC clients 2a and 2b. According to the prior art, the PoC initiator 1 will also not find out before the beginning of the PoC session that one of the subscribers, namely the PoC client 2c, is not receiving any voice data Sp. The PoC session is nevertheless established and invoiced in the conventional manner.

Figure 3:
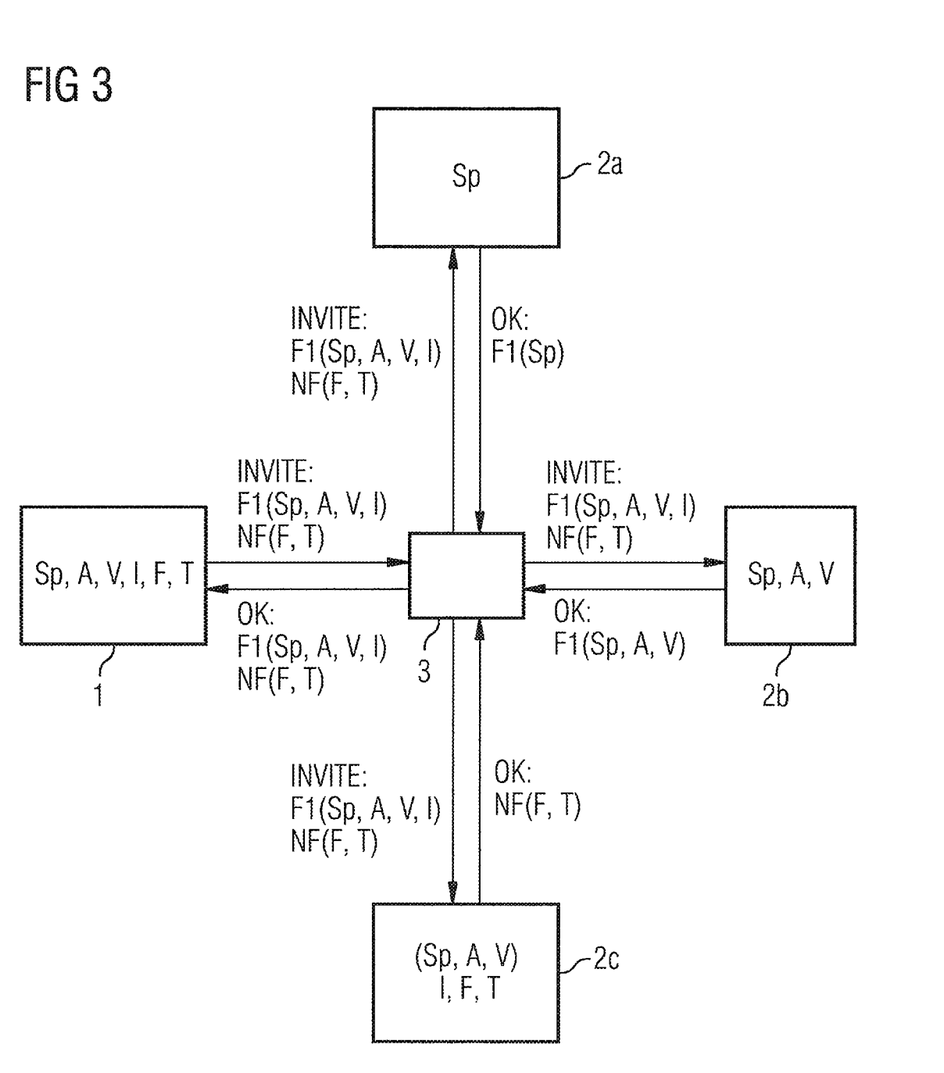
FIG. 3 shows a diagrammatic illustration of the establishment of a PoC session in a communication arrangement according to FIG. 1 for a first embodiment of the invention.

In contrast, FIG. 3 shows the effect of the communication protocol according to the invention on the establishment of a PoC session. As shown in FIG. 2, a PoC link request in the form of an SIP INVITE message is first of all sent to the PoC server unit 3 which forwards it to the selected PoC clients 2a, 2b, 2c. The invention initially does not necessitate any changes in the initiation of a PoC session with the aid of the Session Initiation Protocol.

However, according to the invention, a message field, which is additionally provided in comparison with the prior art, of this PoC link request contains, for instance in the Session Description Protocol, an item of priority information which is used to allocate a transmission priority to the different types of data Sp, A, V, I, T and F to be transmitted. If more than one communication channel is provided, for instance two communication channels F1 and NF in which a group of types of data is respectively combined in an organizational manner, transmission priorities may be defined for the respective group of types of data. For instance, FIG. 3 illustrates that the PoC initiator 1 gives the voice data Sp the highest priority, gives the audio data a lower priority etc. In this example, the image data I are given the lowest priority in the communication channel F1. In the communication channel NF, the other data F have a higher transmission priority than the text data T.

For the practical implementation of the invention, the PoC initiator 1 has a unit (cannot be seen in FIGS. 3 and 4) for creating a PoC link request containing an item of priority information which is used to allocate a transmission priority to the different types of data Sp, A, V, I, T, F to be transmitted via the communication channel F1, NF and a transmitting unit (cannot be seen in FIGS. 3 and 4) for transmitting the PoC link request to a further PoC client 2.

With reference to FIG. 3, the PoC client 2a again supports only voice data Sp and is also available for a PoC session. The PoC client 2a therefore accepts the establishment of a communication channel F1 for voice data Sp. This is allowed by the communication protocol since the PoC client 2a is available for the type of data having the highest transmission priority, namely for voice data Sp.

The PoC client 2b again supports voice data Sp, audio data A and video data V and is likewise available for a PoC session. The PoC client 2b therefore accepts the establishment of a communication channel F1 for voice data Sp, audio data A and video data V. The communication protocol first of all allows a communication channel F1 to be established for voice data since this is the type of data having the highest transmission priority. However, the transmission of the type of data A having a lower transmission priority via this communication channel F1 is also allowed since the PoC client 2b is also available for all types of data having a higher transmission priority, that is to say voice data Sp. Furthermore, the transmission of the type of data V having a lower transmission priority via this communication channel F1 is also allowed since the PoC client 2b is also available for all types of data having a higher transmission priority, that is to say voice data Sp and audio data A.

The PoC client 2c again supports all types of data but is available only for image data I, other data F and text data T. The PoC client 2c therefore accepts the establishment of a communication channel F1 for image data I and the establishment of a communication channel NF for other data F and text data T. However, since the PoC client 2c is not available for the type of data having the highest transmission priority, namely for voice data Sp, the communication channel F1 is not established to the PoC client 2c even though the PoC client 2c would be available for image data I. This expresses the difference between the communication protocol according to the invention and the prior art according to FIG. 2.

However, since the PoC client 2c is available for the type of data having the highest transmission priority in the communication channel NF, namely for other data F, the communication channel NF is established. However, the transmission of the type of data T having a lower transmission priority is also allowed via this communication channel F1 since the PoC client 2c is also available for all types of data having a higher transmission priority, namely other data F.

In this exemplary application, the PoC clients 2a and 2b would therefore interchange voice data Sp with the PoC initiator 1, and the PoC client 2c would interchange text data T and other data F.

The method according to the invention therefore fully achieves the object according to the invention for those cases in which only a single communication channel is defined. If a plurality of communication channels are defined, as in FIG. 3, PoC sessions in which not all of the subscribers can share at least one type of data may still occur.

Figure 4:
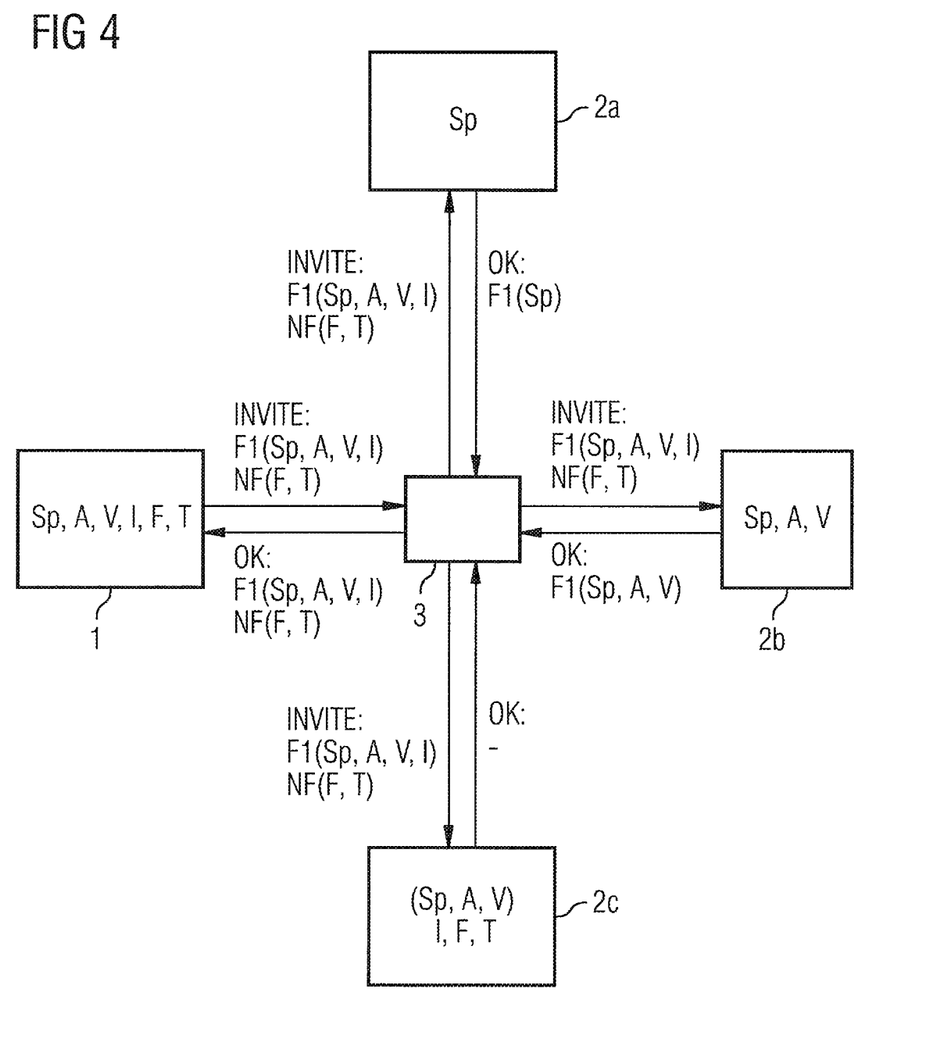
FIG. 4 shows a diagrammatic illustration of the establishment of a PoC session in a communication arrangement according to FIG. 1 for a second embodiment of the invention.

Therefore, a further embodiment which is illustrated in FIG. 4 may be provided. In this case, a message field, which is additionally provided in comparison with the prior art, of the PoC link request contains, for instance in the Session Description Protocol, a further item of priority information which is also used to allocate a transmission priority to the communication channels F1, NF, and the communication protocol allows the communication channel NF having the lower transmission priority to be established only when the communication channel F1 having the higher transmission priority has been established. This rule initially leaves the establishment of communication channels with the PoC clients 2a and 2b unchanged, as a comparison of FIG. 4 with FIG. 3 shows, since the communication channel F1 having the highest transmission priority is established anyway.

With regard to the PoC client 2c, however, it is now shown that the communication protocol according to the invention now does not allow the communication channel NF to be established since the communication channel F1 having the higher transmission priority has not been established. As a result, a PoC session with the PoC client is not established. Instead, only the PoC clients 2a and 2b participate in the PoC session with the PoC initiator 1, in which case all subscribers can interchange voice data Sp and can therefore share at least one type of data.

The invention therefore also ensures in these cases that a PoC client 2a, 2b, 2c is admitted to a PoC session only when it is ready to receive at least one type of data in common with all other PoC clients participating in the PoC session.

It may be noted with regard to FIG. 4 that the PoC session is established only with the PoC client 2c if the assignment of priorities to the communication channels F1 and NF is reversed. This is because, in this case, the communication channel NF has a higher transmission priority than the communication channel F1, with the result that the communication protocol according to the invention does not allow the communication channel F1 to be established with the PoC clients 2a and 2b since the communication channel NF having the higher transmission priority has not been established.

A further embodiment of the method according to the invention involves assigning a transmission priority to the types of data irrespective of the allocation of priorities to communication channels. A plurality of types of data can therefore have the same transmission priority but each type of data has only one assigned priority. The PoC initiator 1 could respectively give the highest transmission priority to voice data Sp, audio data A and video data V, could give the second highest priority to image data I and could give the lowest priority to all other types of data, for instance. The PoC clients 2a, 2b and 2c therefore participate in the PoC session only when they are available for voice data Sp, audio data A and video data V. With regard to the example in FIG. 4, this would mean that only the PoC client 2b could participate in a PoC session with the PoC initiator 1.

The invention therefore makes it possible, in a particularly simple but also versatile manner, to admit a PoC client 2a, 2b, 2c to a PoC session only when it is ready to receive types of data desired by the PoC initiator 1.

The invention claimed is:

1. A method for establishing a push-to-talk communication link between a first push-to-talk device and a second push-to-talk device, comprising:
   transmitting data of different types between the first push-to-talk device and the second push-to-talk device;
   transmitting a push-to-talk link request, from the first push-to-talk device, for a mutual transmission of different types of data to the second push-to-talk device; and
   establishing a communication link for at least a selection of the different types of data via a communication channel according to a communication protocol,
   wherein the push-to-talk link request includes an item of priority information which is used to allocate a transmission priority to the different types of data to be transmitted via the communication channel, and in response to the push-to-talk link request from the first push-to-talk device, the communication protocol allows a communication channel to be established with the second push-to-talk device only when the second push-to-talk device is available for type or types of data having a highest transmission priority and allows a type of data having a lower transmission priority to be transmitted via the communication channel only when the second push-to-talk device is available for the type of data having the lower transmission priority and the second push-to-talk device is available for all types of data having a higher transmission priority than the lower transmission priority;

wherein the types of data having the higher transmission priority include a plurality of types of data.

2. The method as claimed in claim 1, wherein a first communication channel is used for a first subgroup of the different types of data to be transmitted, and a second communication channel is used for a second subgroup of the different types of data to be transmitted.

3. The method as claimed in claim 2, wherein the push-to-talk link request includes an item of priority information which is used to allocate a transmission priority to respective communication channels, and the communication protocol allows a communication channel having the lower transmission priority to be established only when a communication channel having the higher transmission priority has been established.

4. The method as claimed in claim 1, wherein the push-to-talk communication link is a mobile radio communication link.

5. The method as claimed in claim 1, wherein
the push-to-talk link request is made using an SIP INVITE message.

6. The method as claimed in claim 5, wherein the transmission priority is allocated in a Session Description Protocol.

7. The method of claim 1, wherein the data of different types includes at least one of voice data, audio data, video data, image data, text data or other textual data.

8. The method of claim 1, wherein the different types of data to be transmitted via the communication channel and which are allocated a transmission priority by the item of priority information includes at least video data or image data.

9. A first push-to-talk device for establishing a push-to-talk communication link to a second push-to-talk device, comprising:

a communications channel in which data of different types is transmitted between the first push-to-talk device and the second push-to-talk device according to a communication protocol; and wherein the first push-to-talk device creates a push-to-talk link request including an item of priority information which is used to allocate a transmission priority to the different types of data to be transmitted via the communication channel, and transmits the link request to the second push-to-talk device;

wherein, in response to the push-to-talk link request from the first push-to-talk device, the communication protocol allows a communication channel to be established with the second push-to-talk device only when the second push-to-talk device is available for a type or types of data having a highest transmission priority and allows a type of data having a lower transmission priority to be transmitted via the communication channel only when the second push-to-talk device is available for the type of data having the lower transmission priority and the second push-to-talk device is available for all types of data having a higher transmission priority than the lower transmission priority;

wherein the types of data having the higher transmission priority include a plurality of types of data.

10. A communication arrangement for establishing a push-to-talk communication link, comprising:

a first push-to-talk device;

a second push-to-talk device, wherein data of different types is transmitted via a communication channel according to a communication protocol; and a push-to-talk server, wherein the first and second push-to-talk devices each creates a push-to-talk link request and transmits the push-to-talk link request to each other device, the push-to-talk link request from the first push-to-talk device includes an item of priority information which is used to allocate a transmission priority to the different types of data to be transmitted via the communication channel, and the push-to-talk server includes a communication protocol which, in response to the push-to-talk link request from the first push-to-talk device, allows a communication channel to be established between the first push-to-talk device and the second push-to-talk device only when the second push-to-talk device is available for a type or types of data having a highest transmission priority and allows a type of data having a lower transmission priority to be transmitted via the communication channel only when the second push-to-talk device is available for the type of data having the lower transmission priority and the second push-to-talk device is available for all types of data having a higher transmission priority than the lower transmission priority;

wherein the types of data having the higher transmission priority include a plurality of types of data.

* * * * *